United States Patent [19]

Mainardi

[11] 4,226,833
[45] Oct. 7, 1980

[54] APPARATUS FOR OBTAINING BIAMMONIUM PHOSPHATE

[75] Inventor: Anacleto C. Mainardi, Cologna Veneta, Italy

[73] Assignee: Kappa Fertilizzanti S.p.A., Via Quari Destra, Italy

[21] Appl. No.: 892,150

[22] Filed: Mar. 31, 1978

[30] Foreign Application Priority Data

Apr. 6, 1977 [IT] Italy .............................. 48864 A/77

[51] Int. Cl.$^2$ ....................... B01J 1/00; C01B 25/26
[52] U.S. Cl. .................................... 422/189; 71/34; 422/225; 423/310
[58] Field of Search ............... 423/310; 422/188, 189, 422/169, 225; 71/34

[56] References Cited

U.S. PATENT DOCUMENTS

| 995,898 | 6/1911 | Peacock ............................... 423/310 |
| 1,971,563 | 8/1934 | Hirschkind et al. ................... 423/310 |
| 2,033,389 | 3/1936 | Moose .................................. 423/310 |
| 2,051,029 | 8/1936 | Curtis .................................. 423/310 |
| 2,155,853 | 4/1939 | Anthony, Jr. ........................ 422/169 X |
| 3,063,802 | 11/1962 | Maloy .................................. 423/310 |
| 3,153,574 | 10/1964 | Achorn et al. ....................... 423/310 |
| 3,382,059 | 5/1968 | Getsinger ............................... 71/34 |
| 3,459,499 | 8/1969 | Mullen, Jr. ......................... 422/189 X |
| 3,514,255 | 5/1970 | Wiener ................................ 423/310 |
| 3,572,990 | 3/1971 | Farr et al. ............................ 71/34 X |
| 3,687,618 | 8/1972 | Clausen ................................ 71/34 X |
| 3,974,263 | 8/1976 | Crerar et al. ........................ 423/313 |
| 4,028,087 | 6/1977 | Schultz et al. ....................... 71/34 X |

FOREIGN PATENT DOCUMENTS

2031879 11/1970 France ................................... 423/310

Primary Examiner—Arnold Turk
Attorney, Agent, or Firm—Brooks, Haidt, Haffner & Delahunty

[57] ABSTRACT

Biammonium phosphate is obtained by the neutralization of phosphoric acid with ammonia in a saturator operating at atmospheric pressure. Unreacted gaseous ammonia is washed in a tower with a "rain" of phosphoric acid for ammonia recovery without any saline deposit, scaling or clogging. A second tower collects the overflow of washing acid.

4 Claims, 1 Drawing Figure

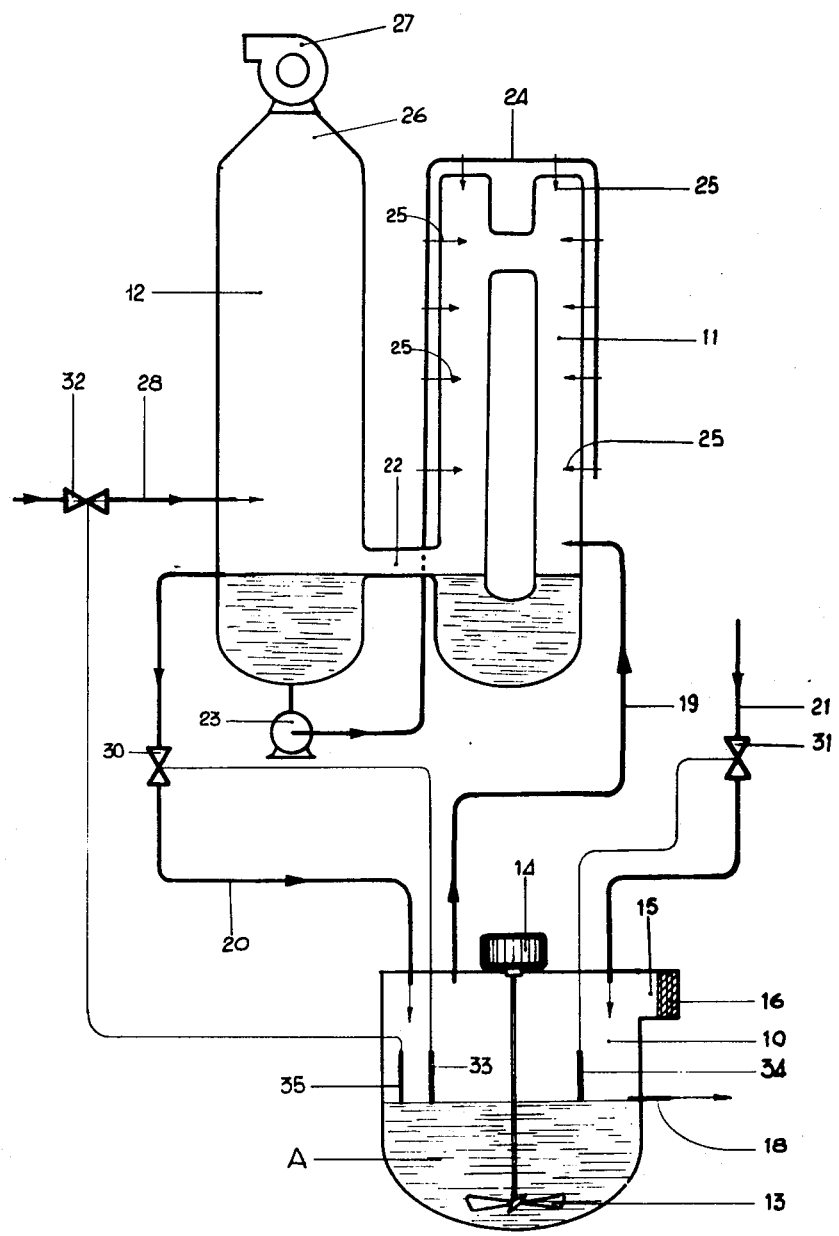

APPARATUS FOR OBTAINING BIAMMONIUM PHOSPHATE

This invention relates to a new apparatus and a new process for obtaining biammonium phosphate.

At present biammonium phosphate is industrially obtained operating in a depressed condition, that is at a pressure lower than the atmospheric pressure, by neutralization of the phosphoric acid with ammonia, thus obtaining biammonium phosphate solutions which are then concentrated, crystallized, dried and so forth.

In the case of a continuous neutralization, the phosphoric acid saturation apparatus of the prior art has been particularly complex, since it is necessary to operate with biammonium phosphate solutions having a PH value ranging from 7 to 6.5 and in these conditions the ammonia used is fixed by the phosphoric acid with great difficulty and only partially.

The saturator in which this operation takes place essentially comprises a large container provided with an agitator in which phosphoric acid and ammonia are fed continuously and in a given relation, thus obtaining biammonium phosphate solutions. Since the reaction is highly exothermic, a large quantity of heat is developed causing high water evaporation and a generation of steam that leaves the apparatus together with the ammonia gas which has not reacted. It is difficult to recover these quantities of ammonia gas that usually do not exceed about 85% of the ammonia used, although the process is completely carried out in extremely complex apparatus. Moreover, this kind of apparatus is easily subject to clogging.

The apparatus according to the invention overcomes the drawbacks set forth above and, yet by having an extremely simple structure and reduced dimensions, it allows the ammonia in the gas to be completely recovered without any saline deposit, scaling and clogging.

An essential feature of the apparatus according to the invention is that the neutralization process of the phosphoric acid is carried out therein at atmospheric pressure and not in depression, allowing a large amount of air to enter the saturator, which air becomes heated and charged with steam, due to the heat generated by the neutralization reaction.

This heated and steam-saturated air, containing the gaseous ammonia that has not reacted, as well as drops of solution and the like, then undergoes a quick washing process at a temperature lower than the dew point and, in any case, such as to avoid the condensation of the steam in the air.

The gas washing process carried out at a temperature of 70°-80° C. thus allows the ammonia to be completely removed from the gas, within the first portion of the apparatus, without any water condensation. Since this gas is subsequently fed to the second portion of the apparatus, wherein it moves very slowly, the collection takes place of any drops of solution and the like suspended in the gas.

The invention will be now described in detail with reference to the annexed drawing, wherein a saturator constructed and operating according to this invention is schematically shown, as a nonlimitative example, together with the related ammoniacal gas recovery section.

The apparatus according to the invention essentially comprises a saturator 10 and an ammoniacal gas recovery section including a first tower 12 and a second tower 11 suitably connected to each other and saturator 10.

Saturator 10 has suitable agitating means 13, continuously moving the fluid body, operated by suitable means such as a motor 14, and an opening 15, possibly provided with a filter 16, connecting directly the interior of saturator 10 to the atmosphere. Moreover, saturator 10 has an outlet 18 for the biammonium phosphate solution produced therein. Pipes 19 and 20 connect saturator 10 to tower 11 and tower 12, respectively.

Finally, pipe 21 connects saturator 10 to a suitable tank (not shown) feeding the ammoniacal solution.

As clearly shown in the drawing, towers 11 and 12 are connected to each other through pipe 22 while a pump 23 draws, from the bottom of tower 12, the phosphoric acid contained therein and feeds the same to tower 11 through pipe 24. In tower 11 the acid is sprayed by means of the array of nozzles 25. Moreover, the top of tower 12 is opened at 26 and the opening is suitably connected to a large fan 27.

Finally, valves 30, 31 and 32 control pipes 20 and 21 and pipe 28, respectively, which pipe 28 feeds the phosphoric acid to tower 12. These valves, suitably connected to PH detectors 33, 34 and 35, contained in body A of the solution within saturator 10, control the flow of ammonia and phosphoric acid in order to maintain constant the PH valve of this solution.

In the above described apparatus, phosphoric acid at 85% concentration and an ammoniacal solution at 22-24% ammonia concentration by weight are fed to saturator 10 through pipes 20 and 21, respectively, so that a biammonium phosphate solution A, having a PH value ranging from 7 to 7.2, is continuously produced within saturator 10. This solution at the concentration of about 80% continuously leaves saturator 10 through overflow pipe 18.

The operation of fan 27 causes the air to enter saturator 10 through opening 15, which air charges both with the steam released from solution A, due to the reaction heat, and with the vapours consisting of the ammonia which has not reacted.

This air is then fed to tower 11 through pipe 19, wherein the air is "washed" from the ammonia contained therein by the "rain" of phosphoric acid fed to nozzles 25 by pump 23 through pipe 24, the washing process being carried out at a temperature of about 70°-80° C.

It is necessary to point out that the phosphoric acid rain in tower 11 eliminates substantially all the ammonia present in the air, through a complete fixation thereof, and also washes continuously and completely the inner walls of the tower, and more generally all the portions thereof which are subject to the deposit of solid material and, accordingly, this deposit is completely avoided.

The phosphoric acid circulates within the tower at high speed and in large amounts, collects in the bottom thereof, leaves tower 11 through overflow pipe 22 and enters tower 12 where its cycle is continued by circulating pump 23 towards tower 11 and saturator 10 through pipe 20.

The air, completely free from ammonia, but still containing all the water separated in separator 10 and from the solution drops, leaves tower 11 through pipe 22 and enters tower 12, which is completely empty, and a complete separation of the liquid drops takes place therein, due to the loss of speed of the gas. Because of the large volume rate of flow therethrough, the pipe 22 is preferably of a larger diameter than the aforementioned pipes.

Thus, air free from ammonia and suspended drops are discharged into the atmosphere through opening 26 and fan 27.

As clearly set forth above, the phosphoric acid is fed to tower 12 through pipe 28 and to saturator 10 through overflow pipe 20, in amounts metered as needed through valves 30 and 32 under control of PH detectors 33 and 35. The same thing is true for the ammoniacal solution through pipe 21, valve 31 and PH detector 34.

Accordingly, it will be evident that in the apparatus according to the invention a process is carried out for obtaining biammonium phosphate, this process comprising the steps of: feeding simultaneously phosphoric acid and ammoniacal solution to a saturator in suitable amounts determined by measuring the PH of the solution of such substances; keeping the saturator in communication with the atmosphere and feeding a large air amount to the same; feeding the air from the saturator to a washing tower maintained at a temperature of 70°–80° C. and "washing" this air with a "rain" of phosphoric acid in order to free it from the ammoniacal gas produced by the ammonia that has not reacted within the saturator; then feeding this air to a another tower wherein its speed is reduced. This other tower is connected to the washing tower and receives the overflow of washing acid therefrom. Furthermore, this other tower is an effective tank for the phosphoric acid that is used both for being fed to the washing tower under a certain pressure and for being overflowed into the saturator.

Furthermore, it will be evident that the apparatus and process for obtaining biammonium phosphate according to this invention efficiently attains the object set forth above of overcoming the drawbacks of the prior art apparatus, thus allowing substantially all the ammonia to be recovered, avoiding undesired scaling and fouling and causing substantially clean air to be discharged into the atmosphere.

It is intended that certain changes and modifications may be made in the apparatus and process described and illustrated above without departing from the spirit and scope of the invention.

I claim:

1. Apparatus for obtaining biammonium phosphate, comprising: a first tower operating as an effective tank of phosphoric acid, said first tower being connected to a phosphoric acid source and receiving therefrom the acid for biammonium phosphate production, said first tower having a bottom for collecting said acid; a saturator open to the atmosphere for free entry of air thereto, said saturator being provided with mechanically operated agitating means; a second tower operating as a washing tower provided with spraying means adapted to produce a rain of liquid therein; a first pipe connecting said first tower to said saturator, said first pipe receiving from said first tower an overflow of phosphoric acid from said first tower bottom; a second pipe provided with a pump, said second pipe connecting the bottom of said first tower to said spraying means of said second tower, in order to produce a rain of phosphoric acid therein; a third pipe connecting an upper portion of said saturator to an upper portion of said second tower; a fourth pipe with larger cross section than said first, second and third pipes connecting a lower portion of said first tower to a lower portion of said second tower; a fifth pipe connecting said saturator to a tank feeding ammoniacal solution to said saturator; an overflow pipe for exit from the saturator of biammonium phosphate solution produced within the saturator; and mechanical means adapted to produce a strong air draft from the atmosphere into said saturator and thence into said second tower via said third pipe and thence to said first tower via said fourth pipe and from said first tower into the atmosphere.

2. Apparatus according to claim 1, including means for maintaining said second tower at a temperature ranging from 70° C. to 80° C.

3. Apparatus according to claim 1, wherein a pipe feeding phosphoric acid to said first tower and first and fifth pipes feeding phosphoric acid and ammoniacal solution, respectively, to said saturator are controlled by valves controlled by PH detectors immersed in the biammonium phosphate solution in said saturator.

4. Apparatus according to claim 1, wherein said mechanical means adapted to produce an air draft is an aspirator placed at an outlet of said first tower.

* * * * *